United States Patent
Rovella, II

Patent Number: 5,441,200
Date of Patent: Aug. 15, 1995

[54] TROPICAL CYCLONE DISRUPTION

[76] Inventor: Ernest J. Rovella, II, 5090 Rosewood Rd., Vero Beach, Fla. 32966

[21] Appl. No.: 109,521

[22] Filed: Aug. 20, 1993

[51] Int. Cl.$^6$ ............................................. A01G 15/00
[52] U.S. Cl. ................................................. 239/2.1
[58] Field of Search ............................ 239/2.1, 14.1

[56] References Cited

U.S. PATENT DOCUMENTS

| | | | |
|---|---|---|---|
| 2,550,324 | 4/1951 | Brandau | 239/2.1 |
| 2,903,188 | 9/1959 | Hutchinson | 239/2.1 |
| 3,127,107 | 3/1964 | Merryweather | 239/2.1 |
| 3,534,906 | 10/1970 | Gensler | 239/2.1 |
| 3,896,993 | 7/1975 | Serpolay | 239/2.1 |

OTHER PUBLICATIONS

"Project STORMFURY–Experiments and Outlook" by Helmut K. Weickmann, NOAA Technical Memorandum ERL APCL-21, Dec. 1978.
"Tropical Cyclone Modification: The Project Stormfury Hypothesis" by Robert C. Sheets, NOAA Technical Report ERL 414–AOML 30, Aug. 1981.
"Stormfury and the Hurricane Hunt", Ocean Industry, Sep. 1968, vol. 3 #9, pp. 66–68.
"How to Subdue a Hurricane", Science News, Aug. 21, 1971, vol. 100, pp. 128 and 129.
"Seeding Stormfury's Ginger: Nothing definitive", Science News, Jan. 15, 1972, vol. 101, p. 38.

*Primary Examiner*—Karen B. Merritt

[57] ABSTRACT

A chemical which allows water to chemically join its crystalline lattice is applied to the eye wall of a tropical cyclone to initiate a self destructive catalyzing effect. If applied in powdered form to the upper, center portions of the eye wall, the effect will be greater. Water vapor within the eye wall chemically joins the lattice of the chemical. These larger molecules will also develop through collision and coalesce. Now the vapor of the eye wall is heavier and will spin outwards from Centrifugal Force. As a result of the larger eye, barometric pressure in the eye increases, wind speed slows, and the storm surge decreases to minimal proportions.

5 Claims, 3 Drawing Sheets

FIG 3
FIG 4

TROPICAL CYCLONE DISRUPTION

BACKGROUND OF THE INVENTION

1. Field of Invention

The purpose of the procedure would be to eradicate the threat of tropical cyclones. This invention would slow winds speeds and prevent storm surges. There would still be the great amount of rainfall associated with a tropical cyclone which many communities depend on.

An applicable chemical for the described invention would be a chemical compound that is associates with water in definite proportions. Water should be able to chemically join the crystalline lattice of the chemical. For description purposes the chemical will be referred to as a hydrate. If it is anhydrous, then it has no water of crystallization in its composition. An anhydrous hydrate has no water among its composition but has the ability to readily accept water into the lattice for additional size and strength.

The more readily the chemical used can associate with water, the better that chemical would be to use. To facilitate the association with water, it is better to have the anhydrous hydrate in a fine powdered form. The smaller the particle, the easier it can be surrounded with water.

Anhydrous hydrates are a kind of salt. Because of their crystalline structure, salts are used as ice-nucleating crystals. This means, when the conditions are right, salts can be used to initiate the rain drop. The salt is the seed of the rain drop. The seed grabs water out of the air bit by bit until it becomes large enough to drop to the ground. In a normal circumstance ice would serve this purpose; however, salts are one of the chemicals that can take the place of ice.

The selected hydrate must first be ground up into a powdered form. Then it must be carefully heated up, to separate the water from the composition. This process makes the hydrate, anhydrous.

The anhydrous hydrate would then be introduced into the upper portions of the eye wall. A large amount of the chemical would need to be administered by a large aircraft. The amount of chemical that would need to be used would vary according to the size of the tropical cyclone, the size of its eye, and the desired effect. Other factors would be wind speed, the amount of water in the air, barometric pressure, humidity, and other factors that help to make up a tropical cyclone. As soon as the chemical is added the tropical cyclone disruption begins. The more chemical that is introduced, the greater the effect will be and the longer it will last. This expectation can be hoped for up to the point where the eye wall is saturated. When this occurs, the left over chemical will reach the ground unabsorbed.

During testing procedures, cupric sulfate had excellent results. However, cupric sulfate can be harmful to the environment. A non-toxic hydrate with good results was sodium tartrate. This is not a limitation of the selection of anhydrous hydrates to use on tropical cyclones; However, environmental impact would be a factor when selecting a hydrate to use.

Once the anhydrous hydrate is introduced into the upper portions of the eye wall, gravity will pull the chemical downward and the winds will circle the chemical throughout the eye wall. During the chemical's journey, it will associate with water and become a hydrate. As it associates with water chemically, the hydrate physically attracts more water out of the air. The hydrate is now the seed of a rain drop.

The fierce speed with which a tropical cyclone can spin, would cause these rain drops to spin outward. In a normal tropical cyclone the eye wall would contain water vapor. The eye wall would swirl around this water vapor at great speeds. Once the chemical is added, a great portion of the water vapor would be brought together into drops of water. These drops of water are going to be heavier than the water vapor. These larger drops will also increase in size through collision and coalesce with other water droplets. Because of Centrifugal Force, these larger drops of water will be cast out away from the center of the tropical cyclone. Then the eye wall will travel outward along with the drops of water. As a result of experiments, the faster the tropical cyclone spun, the greater the eye wall spread outward.

As learned from previous experiments in seeding tropical cyclones, an increase in the size of the eye shows that wind speeds are slowing down. A wider eye also spreads out the pressure variance associated with the eye. The pressure of the eye would not be as low. The barometric pressure in the eye is the most accurate way for determining the strength of a tropical cyclone. The lower the pressure, the more powerful the tropical cyclone. With a wider eye and an increase in pressure, the tropical cyclones intensity is lessened.

As a result of the seeding of the tropical cyclone with the anhydrous hydrate, there would be a sudden increase in rain fall. This is one reason that to avoid flooding, the tropical cyclone should be seeded over water.

During testing procedure, the tropical cyclone would re-intensify if the ideal conditions remained. If the tropical cyclone were seeded just before it hit land, it would not have the chance to reform. It would continue to hit land. Once over land, it would not have the fuel source of the hot, moist air that it receives from the ocean. At this point, the tropical cyclone may effectively die out. The point at which the tropical cyclone would be seeded would vary according to the size and movement speed of the tropical cyclone.

2. Description of the Prior Art

The invention related to tropical cyclones is Leonard H. Hutchinson's patent U.S. Pat. No. 2,903,188 of 1959. He suggests preventing the development of a tropical storm by seeding the beginning composition with nucleating chemicals before the storm develops. With this procedure he hopes to exhaust every weather pattern that might develop. This method is a less practical effort of preventing possible tropical cyclones. My invention deals with mature developed tropical cyclones.

Another method of seeding mature tropical cyclones, was used by Project Stormfury. They attempted to seed the super-cooled water in hurricanes. Silver Iodide was applied to clouds from the eye wall outward in a straight line. With this procedure, they expected to create a new eye wall. This eye wall would be farther outward then the present eye wall. The new eye wall would feed off of the previous eye wall. The aim of the project was to lessen the fury of the winds in mature tropical cyclones. My invention allows for the eye wall to be spread outward much further than had previously even been hoped for. During experiments, the eye increased by up to eleven fold.

The major flaws associated with seeding mature tropical cyclones is the possibility of the tropical cyclone changing directions toward land. With previous seedings of tropical cyclones, one strip from the eye wall outward was seeded. This affected only one section of the tropical cyclone. The disruption of one part of the tropical cyclone left the possibility of it turning. With my invention, the eye wall is seeded and the winds within the eye circulate the chemical throughout the eye. Not just one section is seeded, and the chance of the tropical cyclone turning is lessened.

Another technique in seeding with silver iodide involves applying the silver iodide into the eye wall to develop condensation of water vapor releasing latent heat. It was hoped that this latent heat would offset the pressure variance of the eye. My invention lessens this pressure variance by expanding the diameter of the eye and stretching the variance over a larger area.

SUMMARY OF THE INVENTION

My invention provides a way of diminishing the monstrous forces of tropical cyclones. Intense wind speeds and enormous storm surges would be prevented. With the use of certain seeding agents applied in the proper manner, the tropical cyclone self-destructs. The seeding causes the eye of the tropical cyclone to increase in size initiating a catalyzing effect. An expanded eye lessens pressure variances, slows wind speeds, and reduces storm surges.

BRIEF DESCRIPTION OF THE DRAWINGS

For a complete description of the illustrations, reference should be made to the detailed descriptions.

FIG. 3 is a top view of a tropical cyclone.

FIG. 4 is a top view of a tropical cyclone after treatment.

In all the illustrations the numerals depict the same objects.

1 represents the eye of the tropical cyclone.

2 represents the spiral bands.

3 represents the counter-clockwise motion of the tropical cyclone.

4 represents the eye wall of the tropical cyclone.

5 represents the rising warm air.

6 represents the storm surges within the eye.

DESCRIPTION OF ILLUSTRATIONS

All the illustrations are not to scale and have been exaggerated at points for clarity.

Figure 1:
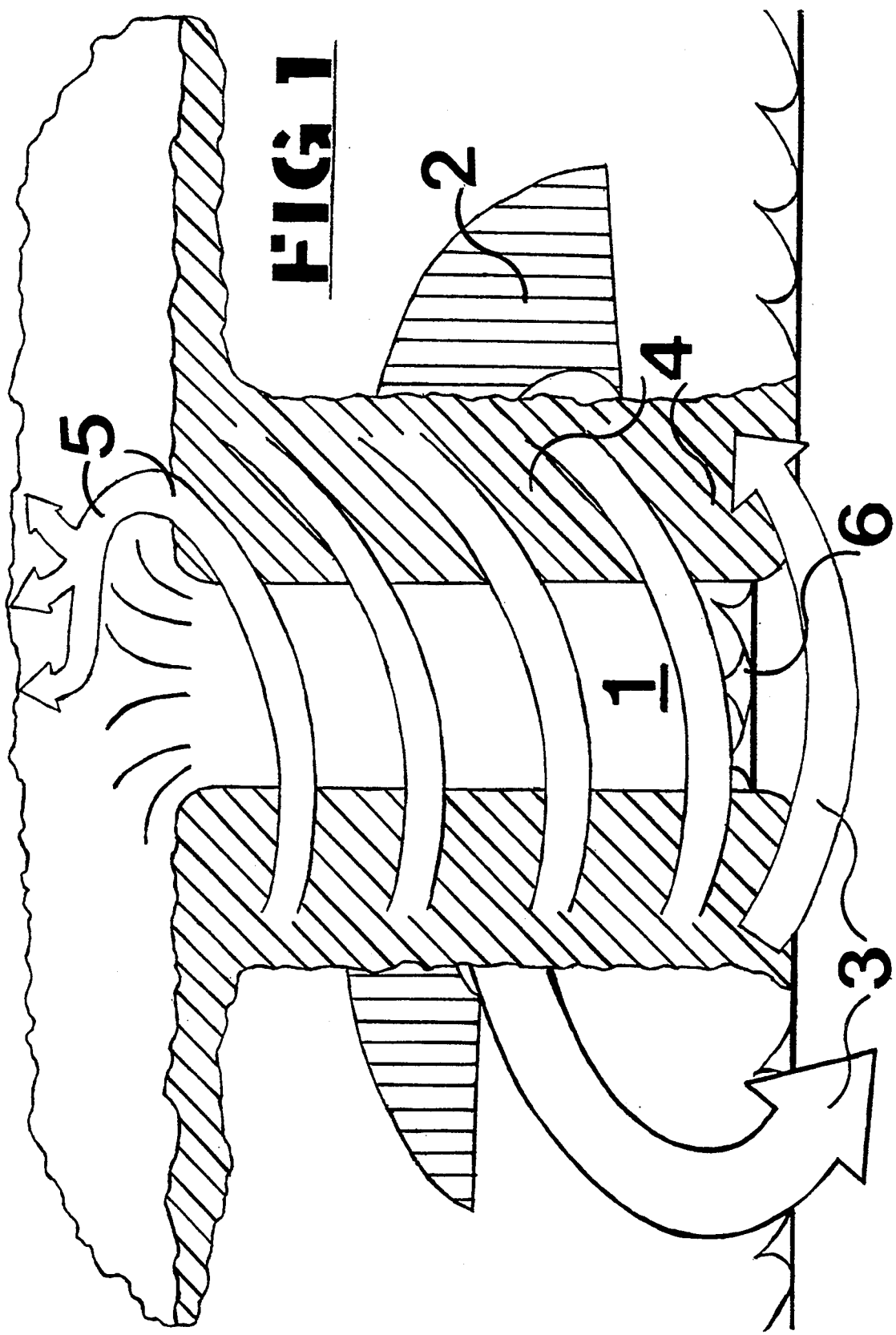
FIG. 1 is a side view of a tropical cyclone vertically dissected through the eye.

In reference to FIG. 1, each numeral represents the individual part of the tropical cyclone. The numeral 1 represents the eye of the tropical cyclone. Here the pressure is extremely lower than that of the surrounding pressure. Throughout the rest of the tropical cyclone the air pressure is much higher.

In FIG. 1, the numeral 2 represents the spiral bands of rain clouds. There are multiple layers of spiral bands rotating with the tropical cyclone. The layers will alternate with bands of cold air and hot air.

In FIG. 1, the numeral 3 designates the direction of the wind within the tropical cyclone. Tropical cyclones that develop in the Northern Hemisphere rotate in a counterclockwise direction.

In FIG. 1, the numeral 4 represents the eye wall of the tropical cyclone. The eye wall possesses the most destructive wind forces of the tropical cyclone. This is the place where the seeding agent would be administered into the upper layers.

In FIG. 1, the numeral 5 represents the rising warm air. As this air reaches the top of the tropical cyclone, it is carried away by horizontal upper atmosphere winds. These winds flow above the tropical cyclone.

In FIG. 1, the numeral 6 represents the storm surges within the eye of the tropical cyclone. These surges can raise the water level inside the eye by twenty-five feet. As a tropical cyclone hits land, the storm surge accounts for the majority of the flooding and deaths associated with mature tropical cyclones.

Figure 2:
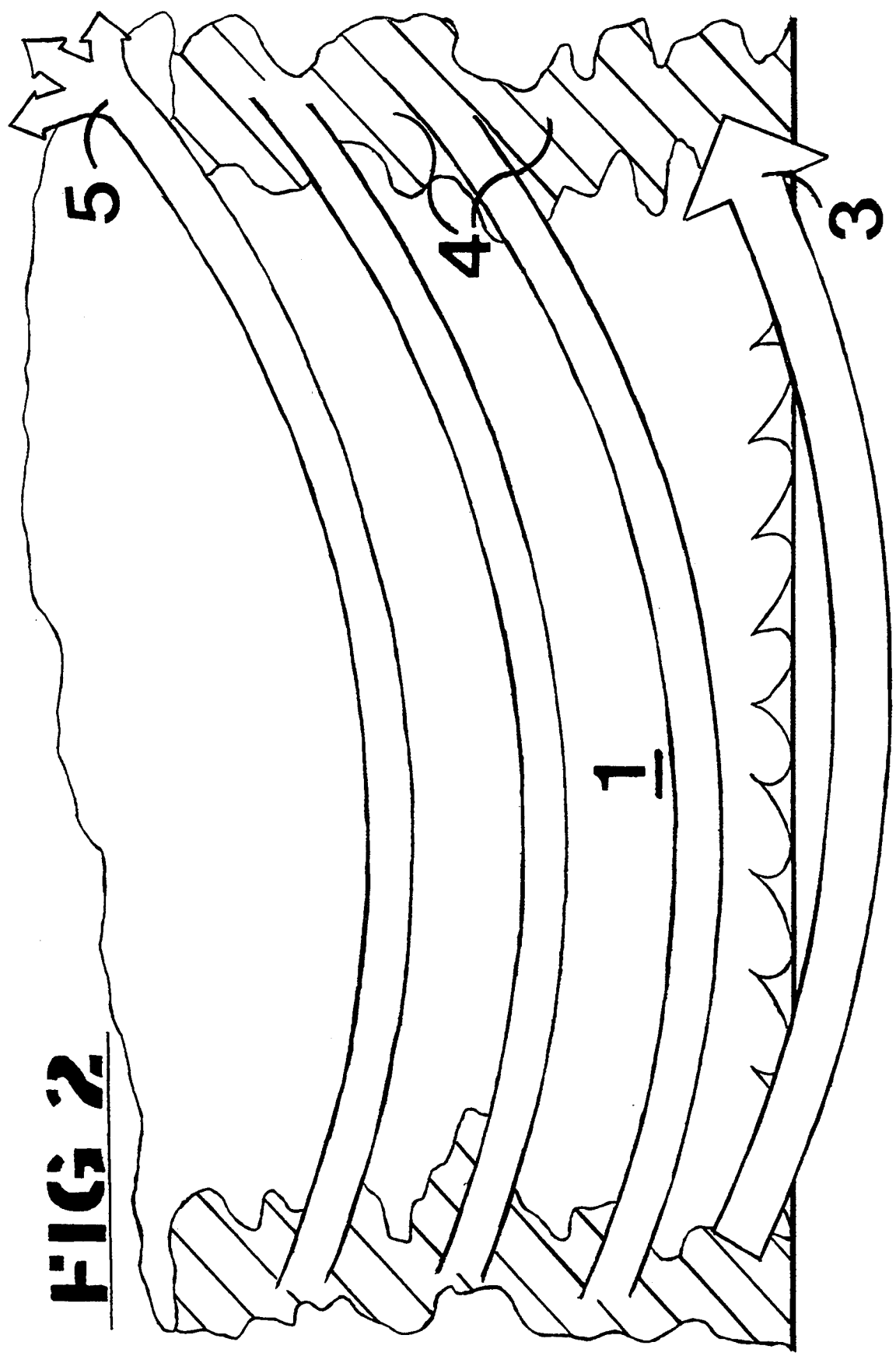
FIG. 2 is a side view of a tropical cyclone vertically dissected through the eye after treatment.

FIG. 2 illustrates a tropical cyclone after being treated. The numeral 1 represents the disorderly eye of the tropical cyclone. Now the size of the eye has greatly increased. The air pressure has also increased.

In FIG. 2, the numeral 3 represents the direction of the wind. The tropical cyclone still rotates counter-clockwise. Now the wind movement is more erratic but less powerful.

In FIG. 2, the numeral 4 represents the eye wall of the tropical cyclone. The intensity and definition of the eye wall has greatly decreased.

In FIG. 2, the numeral 5 represents the rising warm air. Although the air is still rising, it rotates around a wider area before being carried into the upper atmosphere.

FIG. 3 illustrates an average mature tropical cyclone from above. The numeral 1 represents the eye. The numeral 2 represent spiral bands emanating from the tropical cyclone. The numeral 4 represents the eye wall. The numeral 6 represents the storm surges.

FIG. 4 illustrates a tropical cyclone from above after treatment. The numeral 1 represents the enlarged eye. The numeral 4 represents the less defined eye wall. The spiral bands are no longer defined. The storm surge is not a factor anymore.

What I claim is:

1. A process for disrupting a mature, developed tropical cyclone having an eye wall comprising:

introducing a hydrate agent into the eye wall such that the winds of the tropical cyclone will circle the hydrate agent throughout the eye wall;

increasing the centrifugal force on the eye wall of the tropical cyclone as a result of said hydrate agent associating with water present in the tropical cyclone and becoming heavier hydrate drops which are cast out away from the center of the tropical cyclone; and increasing the diameter of the eye wall due to the eye wall traveling outward along with the heavier hydrate drops.

2. The process of claim 1 wherein the hydrate agent is an anhydrous hydrate agent.

3. The process of claim 1 wherein the hydrate agent is introduced into an upper portion of the eye wall.

4. The process of claim 1 wherein the hydrate agent comprises cupric sulfate.

5. The process of claim 1 wherein the hydrate agent comprises sodium tartrate.

* * * * *